(12) United States Patent
Sun

(10) Patent No.: US 8,210,117 B2
(45) Date of Patent: Jul. 3, 2012

(54) BATTERY HOLDER WITH EXPIRATION INDICATOR

(75) Inventor: Zheng-Heng Sun, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 158 days.

(21) Appl. No.: 12/834,022

(22) Filed: Jul. 12, 2010

(65) Prior Publication Data

US 2011/0315070 A1 Dec. 29, 2011

(30) Foreign Application Priority Data

Jun. 23, 2010 (CN) .......................... 2010 1 0207178

(51) Int. Cl.
*G09F 9/00* (2006.01)
*G06F 1/26* (2006.01)
*H01M 2/10* (2006.01)
(52) U.S. Cl. .................. 116/308; 116/307; 116/321
(58) Field of Classification Search ............. 116/308, 116/307, 321, 322, 323, 324, DIG. 1; 40/306, 40/310; 206/459.1; 368/204, 309; 968/400, 968/505; 429/90
See application file for complete search history.

(56) References Cited

U.S. PATENT DOCUMENTS

| 3,672,154 | A | * | 6/1972 | Hubner | 368/204 |
| 4,466,150 | A | * | 8/1984 | Jurt | 116/308 |
| 4,712,504 | A | * | 12/1987 | Zarley et al. | 116/222 |
| 4,951,596 | A | * | 8/1990 | Wallace, Jr. | 116/321 |
| 5,046,605 | A | * | 9/1991 | Levrant | 206/5.1 |
| 5,153,729 | A | * | 10/1992 | Saito | 348/231.6 |
| 5,433,324 | A | * | 7/1995 | Leonard | 206/534 |
| 5,790,478 | A | * | 8/1998 | Besson | 368/66 |
| 5,802,015 | A | * | 9/1998 | Rothschild et al. | 368/10 |
| 5,953,288 | A | * | 9/1999 | Chappell | 368/10 |
| 5,979,356 | A | * | 11/1999 | Emery | 116/324 |
| 7,946,244 | B2 | * | 5/2011 | Dowler et al. | 116/310 |
| 8,020,507 | B2 | * | 9/2011 | Strong | 116/308 |
| 8,096,415 | B2 | * | 1/2012 | Crosby | 206/459.1 |
| 2002/0088152 | A1 | * | 7/2002 | Esterman | 40/299.01 |
| 2008/0257898 | A1 | * | 10/2008 | Pollio | 116/324 |

FOREIGN PATENT DOCUMENTS

DE 3331360 A1 * 3/1985
JP 2004171826 A * 6/2004

\* cited by examiner

*Primary Examiner* — Richard A. Smith
(74) *Attorney, Agent, or Firm* — Altis Law Group, Inc.

(57) ABSTRACT

A battery holder with expiration indicator includes a main body for holding a battery therein, a month mark member, a year mark member, and a pair of clips. The month mark member extends from the main body and includes twelve month marks formed thereon. The year mark member extends from the main body and includes a number of year marks formed thereon. The pair of clips are slidably attached to the year mark member and the month mark member and respectively located at one of the year marks and one of the month marks to set a date.

7 Claims, 2 Drawing Sheets

BATTERY HOLDER WITH EXPIRATION INDICATOR

BACKGROUND

1. Technical Field

The present disclosure relates to an expiration indicator on a battery holder.

2. Description of Related Art

A motherboard always includes a battery holder to hold a battery which powers a complementary metal oxide semiconductor (CMOS) chip to ensure the data saved in the CMOS chip not to be lost. However, if users forget to replace a new battery in time, the data saved in the CMOS chip will be lost, which can affect the operation of the motherboard.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
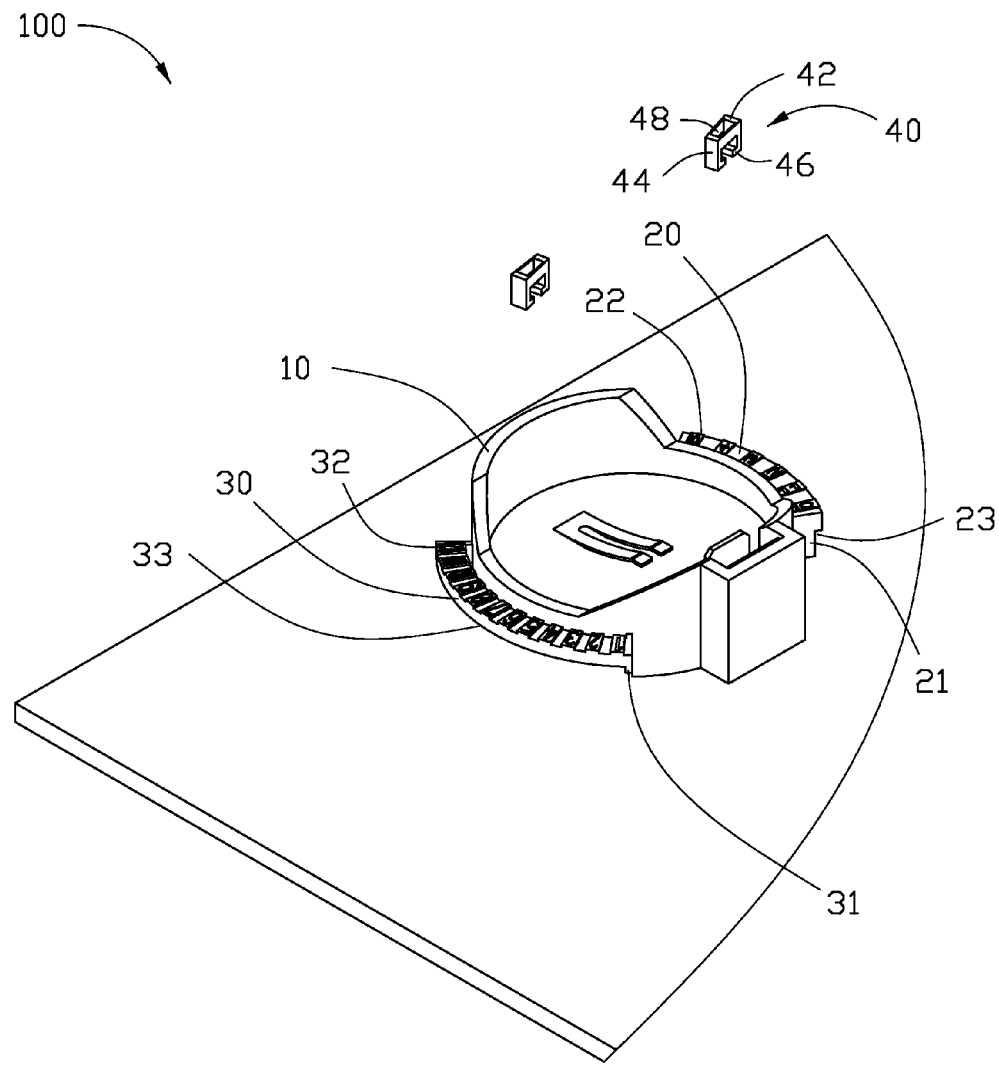
FIG. 1 is an exploded, isometric view of an embodiment of a battery holder with an expiration indicator.

Referring to FIG. 1, an embodiment of a battery holder with expiration indicator 100 (hereafter referred to as battery holder) includes a cylindrical main body 10 to retain a battery (not shown) therein, a year mark member 20, a month mark member 30, and a pair of U-shaped clips 40. The year mark member 20 and the month mark member 30 extend from the outside of the main body 10 in opposite directions and surround the main body 10. It may be understood that the main body 10 falls within well-known technologies, and is therefore not described here.

The year mark member 20 is arc-shaped, and includes an engaging slot 23 defined in a lower portion thereof, and two blocking tabs 21 extending down and located at two opposite ends of the engaging slot 23. The year mark member 20 further includes a plurality of spaced and rectangular raised blocks 22 formed on the top thereof, each raised block 22 marked with a number indicating a year. For example, the numbers are "10", "11", "12", "13", "14", "15", respectively indicating the years 2010, 2011, 2012, 2013, 2014, 2015.

The month mark member 30 is arc-shaped and similar to the year mark member 20. The month mark member 30 includes an engaging slot 33 defined in a lower portion thereof, and two blocking tabs 31 formed at two opposite ends of the engaging slot 33. The month mark member 30 further includes twelve spaced and rectangular raised blocks 32 formed on the top thereof, each raised block 32 marked with a number indicating a month. For example, the numbers are "1" to "12" respectively indicating the month January to December. In other embodiments, the numbers can be replaced by other kinds of marks.

Each of the U-shaped clips 40 includes a top wall 42, and two sidewalls 44 perpendicularly extending down from two ends of the top wall 42. A rectangular opening 48 is defined in the top wall 42, for engaging with the raised blocks 22, 32 of the year mark member 20 and the month mark member 30. Two hooks 46 extend towards each other from the distal ends of the two sidewalls 44. The clip 40 is made of an elastic material, such as plastic. In other embodiments, the year mark member 20 and month mark member 30 may also be designed in other configurations according to requirements.

Figure 2:
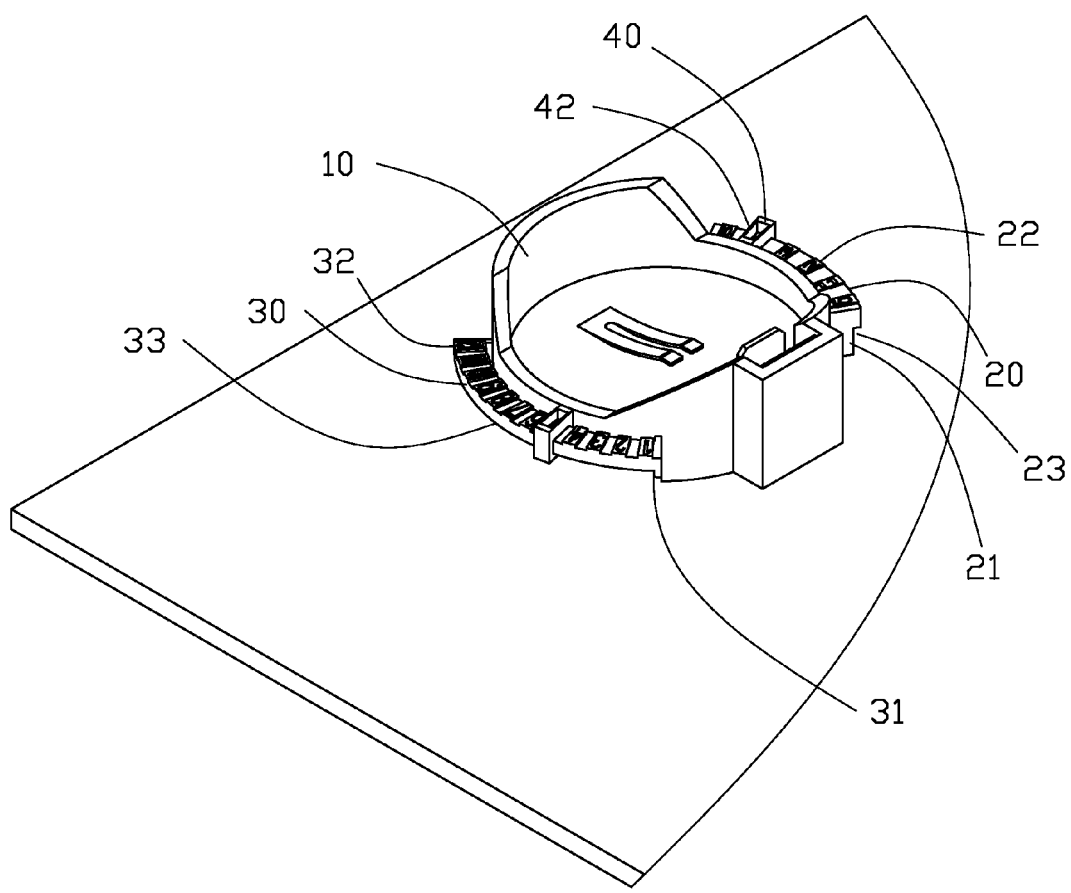
FIG. 2 is an assembled view of the battery holder with an expiration indicator of FIG. 1.

Referring to FIG. 2, in assembly, the two clips 40 are respectively and slidably attached to the year mark member 20 and month mark member 30, with the hooks 46 engaging in the slots of the year mark member 20 and the month mark member 30. The two clips 40 can be slid to respectively locate the year mark member 20 and the month mark member 30, with the openings 48 engaging with the desired or selected raised blocks 22, 32. The blocking tabs 21, 31 of the year mark member 20 and the month mark member 30 can block the clips 40 from detaching from year mark member 20 and the month mark member 30.

In use, if a user want to set an initial date of the battery retained in the main body 10, such as June 2010, one of the clips 40 is slid on the year mark member 20 to move the opening 48 thereof to engage with the raised block 22 marked with number "10", the other one of the clips 40 is slid on the month mark member 30 to move the opening 48 thereof to engage with the raised block 32 marked with number "6". Therefore, setting the initial date of the battery is completed, which can remind the user to replace the battery in time. Users also can set an expiration date of the battery in the similar way.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A battery holder with expiration indicator, comprising:
   a main body for holding a battery therein;
   a month mark member extending from the main body, and comprising twelve month marks formed thereon;
   a year mark member extending from the main body, and comprising a plurality of year marks formed thereon; and
   a pair of clips slidably attached to the year mark member and the month mark member and respectively located at one of the year marks and one of the month marks to set a date.

2. The battery holder with expiration indicator of claim 1, wherein each of the month mark member and the year mark member is arc-shaped and comprises an engaging slot defined in a lower portion thereof, two blocking tabs located at two opposite ends of engaging slot to block the clips, the year and month marks are formed on the tops of the year mark member and the month mark member.

3. The battery holder with expiration indicator of claim 2, wherein each of the clips is U-shaped, and comprises a top wall, two sidewalls extending perpendicularly from two ends of the top wall, and two hooks extending toward from the ends of the two sidewalls to engage in the engaging slot of the year mark member and the month mark member, the top wall defines an opening to view a corresponding month mark or a corresponding year mark.

4. The battery holder with expiration indicator of claim 3, wherein the month marks and the year marks are marked on a plurality of raised blocks extending from the tops of the month mark member and year mark member, the raised blocks are selected to engage in the openings of the clips.

5. The battery holder with expiration indicator of claim 1, wherein the month marks and the year marks are numbers.

6. The battery holder with expiration indicator of claim 1, wherein the clips are made of elastic material.

7. The battery holder with expiration indicator of claim 6, wherein the elastic material is plastic material.

* * * * *